US011197039B2

(12) United States Patent
Obara

(10) Patent No.: US 11,197,039 B2
(45) Date of Patent: Dec. 7, 2021

(54) SYSTEMS AND METHODS FOR PROVIDING A SLOW MOTION VIDEO STREAM CONCURRENTLY WITH A NORMAL-SPEED VIDEO STREAM UPON DETECTION OF AN EVENT

(71) Applicant: Rovi Guides, Inc., San Jose, CA (US)

(72) Inventor: Takeaki Obara, Tokyo (JP)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 16/340,610

(22) PCT Filed: Oct. 14, 2016

(86) PCT No.: PCT/US2016/057234
§ 371 (c)(1),
(2) Date: Apr. 9, 2019

(87) PCT Pub. No.: WO2018/071046
PCT Pub. Date: Apr. 19, 2018

(65) Prior Publication Data
US 2020/0053401 A1     Feb. 13, 2020

(51) Int. Cl.
*H04N 21/2343*     (2011.01)
*H04N 21/234*     (2011.01)
(Continued)

(52) U.S. Cl.
CPC . *H04N 21/234345* (2013.01); *G06F 16/7867* (2019.01); *G06Q 50/01* (2013.01);
(Continued)

(58) Field of Classification Search
CPC ....... H04N 21/234345; H04N 21/8146; H04N 21/24; H04N 21/2365; H04N 21/23418;
(Continued)

(56) References Cited

U.S. PATENT DOCUMENTS 6,239,794 B1    5/2001   Yuen et al.
6,564,378 B1    5/2003   Satterfield et al.
(Continued)

FOREIGN PATENT DOCUMENTS

| CN | 105165013 A | 12/2015 |
|---|---|---|
| JP | 2015012574 A | 1/2015 |
| JP | 2015525510 A | 9/2015 |

OTHER PUBLICATIONS

C. Patrikakis et al., "Personalized Coverage of Large Athletic Events," in IEEE MultiMedia, vol. 18, No. 4, pp. 18-29, Apr. 2011, doi: 10.1109/MMUL.2010.69. (Year: 2011).*

(Continued)

*Primary Examiner* — Cynthia M Fogg
(74) *Attorney, Agent, or Firm* — Haley Guiliano LLP

(57) ABSTRACT

Methods and systems for providing a video stream along with a slow motion video showing a particular event depicted in the video stream are described herein. The method includes generating a first video stream and generating a second video stream, which is a slow motion video stream, from the first video stream by modifying a playback speed of the first video stream. The method includes monitoring content of the first video stream to identify an event trigger of a predefined set of event triggers. Each event trigger indicates a presence in the first video stream of an event that is to be generated for display using the second video stream. The method includes determining, based on the identifying of the event trigger, to transmit the second video stream along with the first video stream, and simultaneously transmitting both the first video stream and the second video stream.

20 Claims, 6 Drawing Sheets

(51) Int. Cl.
  *H04N 21/2365* (2011.01)
  *H04N 21/24* (2011.01)
  *H04N 21/81* (2011.01)
  *G06F 16/78* (2019.01)
  *G06Q 50/00* (2012.01)
  *G11B 27/00* (2006.01)

(52) U.S. Cl.
  CPC ....... *G11B 27/005* (2013.01); *H04N 21/2365* (2013.01); *H04N 21/23418* (2013.01); *H04N 21/24* (2013.01); *H04N 21/8146* (2013.01)

(58) Field of Classification Search
  CPC ........... H04N 21/4828; H04N 21/4821; H04N 21/4788; H04N 21/234381; H04N 21/2187; H04N 21/23439; H04N 5/45; G11B 27/005; G11B 27/28; G11B 27/031; G06Q 50/01; G06F 16/7867
  USPC .......................................................... 725/14
  See application file for complete search history.

(56) References Cited

U.S. PATENT DOCUMENTS

| | | | |
|---|---|---|---|
| 7,165,098 B1 | 1/2007 | Boyer et al. | |
| 7,653,131 B2 | 1/2010 | Pan et al. | |
| 7,761,892 B2 | 7/2010 | Ellis et al. | |
| 8,046,801 B2 | 10/2011 | Ellis et al. | |
| 8,495,697 B1* | 7/2013 | Goldfeder | H04N 21/8541 725/142 |
| 2002/0167607 A1* | 11/2002 | Eerenberg | H04N 5/783 348/439.1 |
| 2002/0174430 A1 | 11/2002 | Ellis et al. | |
| 2005/0251827 A1 | 11/2005 | Ellis et al. | |
| 2010/0077441 A1* | 3/2010 | Thomas | H04N 21/25875 725/133 |
| 2010/0153885 A1 | 6/2010 | Yates | |
| 2010/0238303 A1* | 9/2010 | Newell | H04N 21/4223 348/207.11 |
| 2011/0267419 A1* | 11/2011 | Quinn | G06F 3/04842 348/14.08 |
| 2012/0210348 A1 | 8/2012 | Verna et al. | |
| 2012/0210383 A1* | 8/2012 | Sayers | H04N 21/2393 725/116 |
| 2012/0307145 A1* | 12/2012 | Buchheit | H04N 21/8547 348/500 |
| 2013/0022332 A1* | 1/2013 | Platt | H04N 5/262 386/230 |
| 2014/0053214 A1 | 2/2014 | Walker et al. | |
| 2016/0012856 A1* | 1/2016 | Cave, Jr. | G11B 27/005 386/241 |
| 2016/0212485 A1* | 7/2016 | Fahlander | H04N 21/4725 |
| 2016/0225405 A1* | 8/2016 | Matias | G11B 27/031 |
| 2016/0286244 A1* | 9/2016 | Chang | H04N 21/26603 |
| 2017/0332036 A1* | 11/2017 | Panchaksharaiah | H04N 21/4532 |
| 2018/0132011 A1* | 5/2018 | Shichman | H04N 21/23418 |

OTHER PUBLICATIONS

Zhenchen Wang and Dejian Meng, "Personalising sports events viewing on mobile devices," 2013 IEEE 4th International Conference on Software Engineering and Service Science, 2013, pp. 710-713, doi: 10.1109/ICSESS.2013.6615405. (Year: 2013).*

Su Tang and Z. Salcic, "Slow motion in video streaming," 10th IEEE International Conference on Electronics, Circuits and Systems, 2003. ICECS 2003. Proceedings of the 2003, 2003, pp. 1184-1187 vol. 3, doi: 10.1109/ICECS.2003.1301724. (Year: 2003).*

International Search Report and Written Opinion of PCT/US2016/057234 dated Jun. 30, 2017.

International Preliminary Report of Patentability of PCT/US2016/057234 dated Apr. 16, 2019.

International Preliminary Report on Patentability PCT/US2016/057234 dated Apr. 16, 2019.

* cited by examiner

SYSTEMS AND METHODS FOR PROVIDING A SLOW MOTION VIDEO STREAM CONCURRENTLY WITH A NORMAL-SPEED VIDEO STREAM UPON DETECTION OF AN EVENT

CROSS-REFERENCE TO RELATED APPLICATIONS

This application is a national stage application under 35 U.S.C. § 371 of International Application PCT/US2016/057234, filed Oct. 14, 2016, the disclosure of which is hereby incorporated by reference herein in its entirety.

BACKGROUND

Live broadcasts typically show key events, such as scoring plays, tight calls, and challenged plays, in slow motion replays after the event was first shown. These replays are provided at the discretion and decision of a live broadcast provider. Thus, viewers who desire to watch slow motion replays of events not chosen for a slow motion replay by the provider of the live broadcast may become frustrated. Moreover, even when a slow motion replay is provided by the broadcast provider, the timing of the replay is at the broadcaster's discretion, and the viewer does not know when the replay will be shown. For example, the broadcaster may play an advertisement before showing the slow motion replay. A long wait to see the replay can be frustrating for the viewer, especially if the viewer is trying to watch multiple games. Clips of key events are presently available from other sources, such as apps provided by broadcasters or other video sources such as over-the-top ("OTT") video providers like YouTube, but there is a delay before these clips are uploaded, and users have to search them out.

SUMMARY

Methods and systems are provided herein for providing a video stream along with a slow motion video showing a particular event depicted in the video stream. Live video streams, such as streams of sports games, will include key events of particular interest to viewers, such as scoring events, fouls, challenges, race finishes, etc. Events such as these often have fast movement, and they can be better observed in slow motion. To ensure that a viewer can watch these events in slow motion, the methods and systems provided herein generate a slow motion video stream, identify key events in a video stream, and transmit the slow motion video stream that shows the key events to viewers along with the regular speed video stream. The methods and systems described herein overcome the limitations of related art by ensuring that the viewer has access to a slow motion version of a key event at the moment the key event is detected.

In some embodiments, methods and systems are provided herein for providing a slow motion video stream when an event is detected in a video stream. In some embodiments, a media guidance application executed by control circuitry (e.g., of a server) generates a first video stream. For example, the media guidance application may receive one or more live videos from a football game and may generate a video stream for transmitting to users from the received live video(s).

In some embodiments, the media guidance application generates a second video stream, which is a slow motion video stream, from the first video stream by modifying a playback speed of the first video stream. For example, the media guidance application may duplicate the first video stream to create second video stream and then may modify the properties of the second video stream depicting the football game (e.g., to specify a slower playback rate), or may modify the second video stream itself (e.g., by adding frames), to create a slow motion version of the video stream depicting the football game.

In some embodiments, the media guidance application monitors content of the first video stream to identify in the first video stream an event trigger of a predefined set of event triggers. Each event trigger of the predefined set of event triggers indicates the presence in the first video stream of an event that is to be generated for display using the second video stream. For example, an event trigger for a live football game may be the word "touchdown" spoken above a threshold volume level in the audio of the video stream. The media guidance application monitors content of the first video stream depicting the live football game to identify in the first video stream the event trigger (the word "touchdown" above a threshold volume level), which indicates that a touchdown event is present in the first video stream. The media guidance application determines the presence in the first video stream of the touchdown event, which is to be generated for display using the second, slow motion video stream.

In some embodiments, the media guidance application determines a type of an event associated with the event trigger and compares the type to entries of a database, in which each respective entry of the entries associates a different type of event to a predefined slow motion playback speed. The media guidance application identifies a predefined playback speed for the second video stream and modifies a playback speed of the second video stream to equal the predefined playback speed. For example, the media guidance application may determine that the event trigger of the word "touchdown" spoken above a threshold volume level is associated with a touchdown event. The media guidance application then compares the touchdown event type to a database that associates the touchdown event to a predefined slow motion playback speed, e.g., a quarter of the normal playback speed. The media guidance application identifies this ¼ speed for the second video stream and modifies the playback speed of the second video stream showing the touchdown to equal the identified ¼ speed.

In some embodiments, the media guidance application determines a type of virtual graphic to add to the second video stream based on the event trigger. The media guidance application then generates the virtual graphic based on the type of virtual graphic and the content of the second video stream, and adds the virtual graphic to the second video stream. For example, the media guidance application may determine to add a highlight to a receiver in a crowded end-zone based on the event trigger indicating the presence of a touchdown. The media guidance application would generate the highlight to be overlaid on the receiver, and add this virtual graphic (the highlight) to the second video stream.

In some embodiments, when the media guidance application monitors the content of the first video stream to identify the event trigger, the media guidance application receives a social media feed related to the content of the first video stream, and the media guidance application monitors a level of activity on the social media feed. In response to detecting that the level of activity on the social media feed exceeds a threshold level of activity, the media guidance application identifies the event trigger. For example, the media guidance application may receive a social media feed (e.g., a TWITTER feed or FACEBOOK feed) of electronic communications (e.g., social media posts) related to the football game. If the media guidance application determines that a number of posts related to the game increases within a short period of time, the media guidance application may determine that an event has occurred in the game, and thus, the media guidance application may detect the event trigger.

In some embodiments, when the media guidance application monitors the content of the first video stream to identify the event trigger, the media guidance application monitors the content of the first video stream to identify a first factor of the event trigger, the media guidance application monitors the content of the first video stream to identify a second factor of the event trigger, and based on identifying the first factor and the second factor, the media guidance application identifies the event trigger. In such embodiments, the event trigger is not identified when the first factor is identified and the second factor is not identified, and the event trigger is not identified when the second factor is identified and the first factor is not identified. For example, the event trigger may be the announcer saying the word "touchdown" above a threshold volume level. If the media guidance application detects that the announcer says the word "touchdown" but at a lower volume, or the media guidance application detects that the announcer reaches the threshold volume level but does not say the word "touchdown," the media guidance application would not identify this event trigger.

In some embodiments, the media guidance application determines, based on identifying the event trigger, to transmit the second video stream along with the first video stream. For example, because the user would be interested in viewing both the regular stream and the slow motion video with the touchdown, the media guidance application determines, based on identifying the event trigger indicating the presence of a touchdown event, to transmit the second, slow motion video stream of the touchdown along with the first video stream (the video stream showing the touchdown at regular speed).

In some embodiments, the media guidance application also receives data describing an interaction involving a user equipment and monitors the data describing the interaction to identify in the interaction a reference to the event. In this case, the media guidance application can determine to transmit the second video stream along with the first video stream further based on the media guidance application identifying in the interaction the reference to the event. For example, the media guidance application may receive data from a microphone data feed that describes a conversation between two users watching the game. The media guidance application may determine that the users are discussing the touchdown event and then determine to transmit the second video stream along with the first video stream.

In some embodiments, when the media guidance application monitors the data describing the interaction to identify in the interaction the reference to the event, the media guidance application may compare the contents of the data describing the interaction to metadata corresponding to the event; determine, based on the comparison, that the interaction relates to the event; and determine, based on the contents of the data describing the interaction, that the interaction indicates an interest in the event. For example, the media guidance application may compare the contents of the data describing the conversation to metadata describing the touchdown, which may include, e.g., who scored the touchdown, the teams playing, etc. The media guidance application then determines, based on the comparison, that the interaction relates to that touchdown, and determines that the interaction indicates an interest in the event. For example, the media guidance application may receive data indicating that a user has expressed an interest in the player scoring the touchdown, or has expressed an interest in scoring plays.

In some embodiments, the interaction involving the user equipment is an electronic communication received by the user equipment. For example, a user may be chatting over the Internet with another user. In some embodiments, the media guidance application compares the event to a list of events previously transmitted to the user equipment to determine whether the event had been previously transmitted to the user equipment. The media guidance application may determine to transmit the second video stream along with the first video stream further based on whether the event had been previously transmitted to the user equipment. For example, if the media guidance application receives data indicating that two users are chatting about a touchdown, and the media guidance application determines that one user had not yet viewed the touchdown, the media guidance application would determine to transmit the two video streams showing the touchdown so that they may be viewed by the user.

In response to the media guidance application determining to transmit the second video stream along with the first video stream, the media guidance application may simultaneously transmit both the first video stream and the second video stream. For example, the media guidance application transmits the first video stream, which shows the touchdown at regular speed, and the second video stream, which shows the touchdown at a slower speed. Both of these video streams can be simultaneously displayed at user equipment.

In some embodiments, the media guidance application compares a length of the second video stream to a predetermined time period for transmitting the second video stream. In response to determining, based on the comparing, that the length of the second video stream has reached the predetermined time period, the media guidance application discontinues transmission of the second video stream while continuing to transmit the first video stream. For example, if the second video reaches a length of 10 seconds, the media guidance application may discontinue transmission of the slow motion video of the touchdown while continuing to transmit the regular-speed football game.

In some embodiments, the media guidance application monitors the content of the first video stream to identify an end of the event, and in response to identifying the end of the event, the media guidance application discontinues transmission of the second video stream while continuing to transmit the first video stream. For example, the media guidance application may perform motion sensing of the video stream to determine when the touchdown play has ended (e.g., if the video abruptly switches to another vantage point after the touchdown was announced) and, having determined that the touchdown play has ended, discontinues transmission of the slow motion video of the touchdown while continuing to transmit the regular-speed football game.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Methods and systems for providing a video stream along with a slow motion video showing a particular event depicted in the video stream are described herein. Live video streams, such as streams of sports games, will include key events of particular interest to viewers, such as scoring events, fouls, challenges, race finishes, etc. Events such as these often have fast movement, and they can be better observed in slow motion. To ensure that a viewer can watch these events in slow motion, the methods and systems provided herein generate a slow motion video stream, identify key events in a video stream, and transmit the slow motion video stream that shows the key events to viewers along with the regular speed video stream. The methods and systems described herein overcome the limitations of related art by ensuring that the viewer has access to a slow motion version of a key event at the moment the key event is detected.

In some embodiments, a media guidance application generates a first video stream, which is a normal speed video stream showing, for example, a football game. The media guidance application generates a second, slow motion video stream from the first video stream by modifying a playback speed of the first video stream. The media guidance application monitors the content of the first video stream to identify an event trigger from a predefined set of event triggers. Each event trigger indicates that the first video stream includes an event that the media guidance application should generate for display using the second video stream. For example, if the first video stream shows a football game, an event trigger may indicate that the first video stream includes a touchdown. Based on the identifying, the media guidance application determines to transmit the second, slow motion video stream along with the first video stream, and the media guidance application transmits both the first, regular speed video stream and the second, slow motion video stream.

Figure 1:
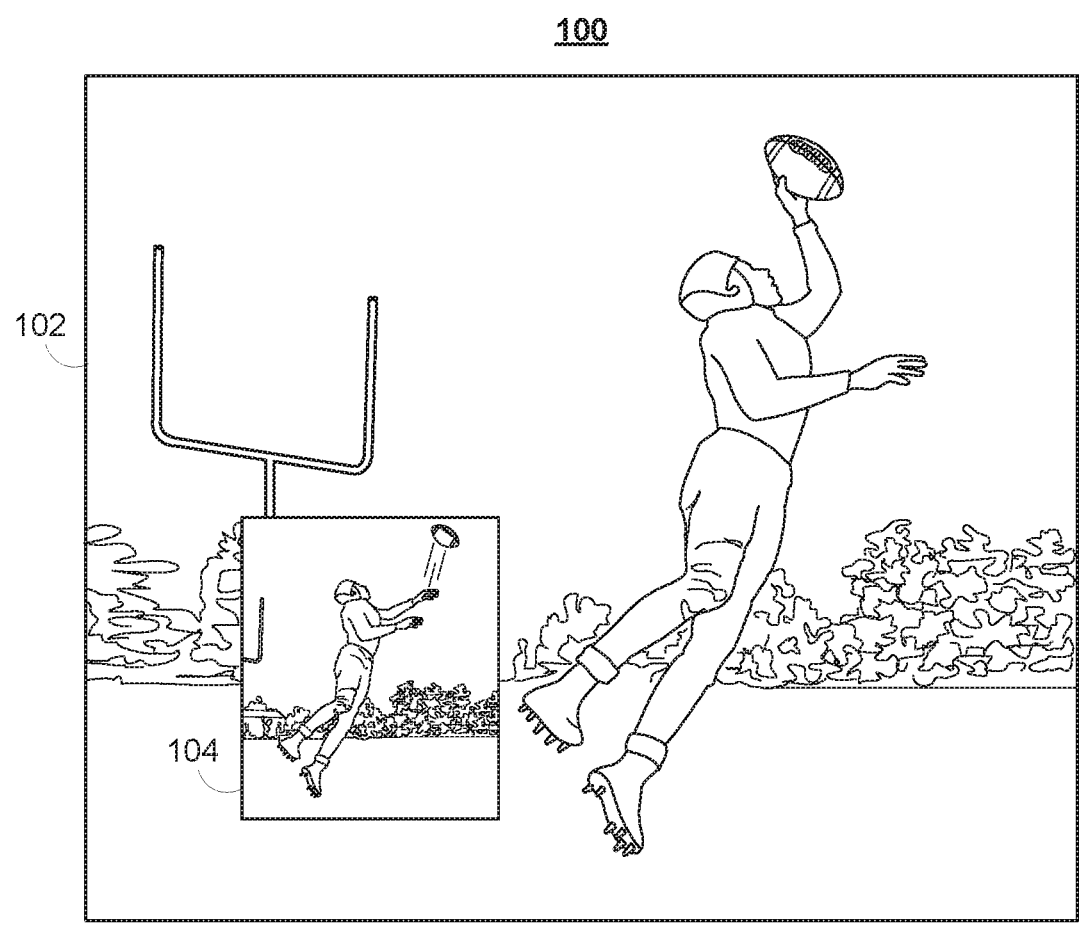
FIG. 1 shows an illustrative example of a display generated by a media guidance application that is displaying two video streams, in accordance with some embodiments of the disclosure.

FIG. 1 shows an illustrative example of a display generated by a media guidance application that is displaying two video streams, in accordance with some embodiments of the disclosure. FIG. 1 shows display 100 (e.g., of user equipment). The display 100 is displaying a first video stream 102 in full-screen and a second video stream 104 in a picture-in-picture window. A media guidance application generates the first video stream 102. For example, the media guidance application may receive one or more live videos from a live event and may generate a video stream for transmitting to users from the received live video(s). The live event may include a sports game, such as a football game, a soccer game, a baseball game, a hockey game, a basketball game, track events, swimming, etc. The live event may include any other type of event, such as an awards show, concert, debate, variety show, etc., in which there would be an interest in seeing a slow motion video clip from the event.

In some embodiments, the media guidance application executed by control circuitry (e.g., of a server) may generate the first stream based on one or more video inputs. The structure and additional functions of control circuitry implementing a media guidance application is further described below with respect to FIG. 4. For example, the media guidance application may receive a single video stream depicting the live event and process and/or format the video stream for transmission to user equipment. As another example, the media guidance application may receive several video feeds, e.g., from several cameras present at the event, and may assemble the feeds to form a single video feed, e.g., using the video feed from one camera angle at one point in time, and using the video feed from another camera at a later point in time. The media guidance application may assemble these feeds fully automatically or based on some manual input. The media guidance application may format the assembled video as needed for transmission to user equipment.

In some embodiments, the media guidance application generates a second video stream 104, which is a slow motion video stream, from the first video stream 102 by modifying a playback speed of the first video stream. For example, the media guidance application may duplicate the first video stream 102 to create second video stream 104 and then may modify the properties of the second video stream 104, e.g., to specify a playback rate at which a media guidance application should display the video of second video stream 104. For example, if a video is typically played back at 24 frames per second, the media guidance application may include data in the second video stream 104 specifying that the second video stream 104 should be played back at 6 frames per second, so that the second video stream 104 is played back at ¼ of the normal playback rate. The media guidance application may have a fixed playback speed for all slow motion video streams (e.g., one half of the regular playback speed, one quarter of the regular playback speed, one eighth of the regular playback speed, etc.). Alternatively, the media guidance application may select a frame rate for the second video stream 104 based on, e.g., the type of live event, the particular event or trigger detected by the media guidance application in the first video stream 102, the amount of visual change between frames, and/or other factors. Manners in which the media guidance application may select a playback speed for second video stream 104 are described in further detail below.

Rather than including data specifying the frame playback rate, the media guidance application may modify the video stream by adding frames in between the original frames to create a slow motion version of the video stream that is displayed at a standard playback rate. The media guidance application may determine the desired speed of the second video stream 104 using any of the techniques described above: the media guidance application may use a fixed speed, or the media guidance application may select a speed for the second video stream 104 based on, e.g., the type of live event, the particular event or trigger detected by the media guidance application in the first video stream 102, the amount of visual change between frames, and/or other factors. The media guidance application then generates the second video stream 104 so that second video stream 104 has the desired speed by duplicating the frames of the first video stream 102 and inserting additional frames between the duplicated frames. For example, the media guidance application could duplicate each frame one or more times, so that the same image is displayed by the media guidance application longer than normal. As another example, the media guidance application may digitally interpolate images between the captured frames to create a smoother transition between the captured frames. The media guidance application would select the number of frames to insert based on the determined speed. For example, if the speed is to be one quarter of the original speed, the media guidance application would add three additional frames between each original frame; if the speed is to be one half of the original speed, the media guidance would add one additional frame between each original frame.

In some embodiments, the video feed may have been recorded with a higher than normal frame rate, so that when the media guidance application generates the first video stream 102, the media guidance application either removes frames from the video, or the media guidance application speeds up the frame rate, so that the video displayed by a media guidance application appears at normal speed. For example, if a standard video stream has 24 frames per second, a camera may be configured to capture the live event at a higher than normal frame rate, e.g., 96 frames per second. A video may be captured this way so that high-quality slow motion streams can be created from the video stream. If a media guidance application plays this high frame rate video at 24 frames per second, the video would appear to slow motion, at one quarter of the speed at which the captured event happened. Therefore, in this case, the media guidance application may not have to modify the second video stream 104 if the desired slow motion speed matches the speed at which the high frame rate video would play back at standard playback frame rate.

In some embodiments, the media guidance application monitors content of the first video stream 102 to identify in the first video stream 102 an event trigger of a predefined set of event triggers. Each event trigger of the predefined set of event triggers indicates the presence in the first video stream 102 of an event that is to be generated for display using the second video stream 104. For example, one event trigger in a live football game may be the word "touchdown" spoken above a threshold volume level in the audio of the first video stream 102. This indicates that a touchdown event is present in the first video stream 102; this touchdown event is to be generated for display using the second, slow motion video stream 104.

As used herein, an event trigger refers to anything that indicates that a portion of the live event includes some event that may be of particular interest to a user. An event trigger may be found in the first video stream 102 by analyzing, e.g., the audio content, visual content, and, if available, closed captioning content of the first video stream 102. An event trigger may be found in auxiliary data, e.g., data from sensors, social media feeds, score or play updates, metadata (e.g., received with the first video stream 102 or received from a third party source), or manual input indicating the presence of an event. Each event trigger may be made up of one or more attributes of the visual, audio, closed captioning content, and/or external data, and may be made up of a combination of different attributes. Attributes identified in the first video stream 102 may include, for example, volume levels, individual words or phrases in the audio or closed captioning, speaker identifications, single-frame visual characteristics, and detected movements. The media guidance application may compare any detected attributes to a predefined set of event triggers to identify an event trigger. Alternatively, the media guidance application may directly identify event triggers in the first video stream 102 or in auxiliary data.

The media guidance application may analyze the audio component of the first video stream 102 to determine various audio attributes, including volume levels, verbal content, and/or identification(s) of the speaker(s). For example, if the media guidance application detects a volume level above a given threshold, this volume level may indicate the presence of an event, or this volume level may indicate a degree of excitement that may be indicative of an event in combination with one or more other factors. The media guidance application may detect a volume above a threshold when an announcer raises his voice, when the crowd is excited, when a gun indicating the start of a race is shot, when a whistle calls a foul, etc. The media guidance application may analyze the verbal content (i.e., the words that are used) to detect whether announcers or other people are responding in real time to an event. For example, the media guidance application may detect an announcer calling a scoring activity (e.g., "Touchdown!", "Goal!"), calling some other type of activity (e.g., "first down," "challenge," "finish line"), or using words to draw attention to an action (e.g., "Look at that!", "I've never seen . . . "). The media guidance application may use more sophisticated speech pattern recognition to identify various attributes of the audio which can be used to identify event triggers. The identification of the speaker may also be relevant to identifying an event trigger; for example, when a referee says "touchdown" during a football game, the video is typically focused on the referee's face, which need not be shown in slow motion. Further, different announcers may have different styles and speech patterns that the media guidance application may consider.

If closed captioning is received or generated at the control circuitry, the media guidance application may analyze the closed captioning data to identify attributes of the closed captioning that media guidance application can use to detect whether announcers or other people are responding in real time to an event. If the closed captioning data includes an identification of the speaker, the media guidance application may also consider the identification of the speaker in identifying an event trigger. The media guidance application may process the closed captioning in the same way that audio information is processed, e.g., to search for keywords or to analyze phrases, sentences, and/or longer passages of speech to identify attributes and event triggers, as described above.

The media guidance application may also analyze the visual component of the video to determine visual attributes that the media guidance application can use to detect events triggers. The media guidance application may analyze each frame separately to identify an attributes within the frames, such as a football that has passed into the end zone, a basketball that is in a net, or a runner crossing a finish line. The media guidance application may additionally or alternatively analyze two or more frames together to detect movement that indicates a visual attribute, such as a football being caught by a receiver or a high jumper leaping off of the ground. The media guidance application may also detect in the video graphic cues, such as the word "Touchdown" or "Goal" on the image, a score changing either in a scoreboard at the event, or a score changing on a scoreboard graphically added to the video. The media guidance application may perform in parallel multiple types of analysis, including any of the visual, audio, and closed captioning analyses described herein or any other methods for analyzing the video and/or accompanying data, to identify visual, audio, and/or subtitle attributes and to identify event triggers.

In some embodiments, the media guidance application determines a type of an event associated with the event trigger and compares the type to entries of a database, in which each respective entry of the entries associates a different type of event to a predefined slow motion playback speed. Different types of live events (e.g., different sports) may have different playback speeds, or different events within a type of live event may have different playback speeds. For example, the media guidance application may determine that the event trigger of the word "touchdown" and a ball being thrown into the end zone is associated with a catching touchdown event, or that the event trigger of the word "touchdown" and a player running the ball into the end zone is associated with a running touchdown event. The media guidance application then identifies a predefined playback speed for the second video stream 104 and modifies a playback speed of the second video stream 104 to equal the predefined playback speed. For example, if the event trigger is associated with a running touchdown event, the media guidance application compares the running touchdown event type to a database that associates the running touchdown event to a predefined slow motion playback speed, e.g., a quarter of the normal playback speed. The media guidance application identifies this ¼ speed for the second video stream 104 and modifies the playback speed of the second video stream 104 showing the touchdown to equal the identified ¼ speed. If the event trigger is associated with the catching touchdown event, the database may have a different predefined slow motion playback speed, e.g., an eighth of the normal playback speed. The media guidance application would then modify the playback speed to be an eighth of the normal playback speed.

The predefined playback speed need not be a constant speed. For example, if an event consists of two actions, such as a catch followed by a run, the media guidance application may set the catch portion of the second video stream 104 to a relatively slow speed (e.g., an eighth of the normal playback speed), and the media guidance application may set the run portion of the second video stream 104 to a faster speed (e.g., half of the normal playback speed). Furthermore, the media guidance application may generate the second video stream 104 such that a single event is shown at a variable rate. For example, the media guidance application may set the moment of a catch to have a slower playback rate than the moments leading up to the catch. The media guidance application may also or alternatively perform a visual analysis of the first video stream 102 and vary the playback speed based on this visual analysis of the first video stream 102. For example, if the media guidance application detects that the first video stream 102 has a high amount of change between frames, the media guidance application may set the second video stream 104 to have a slower playback speed than if the media guidance application detects that first video stream 102 has a lower amount of change between frames.

In some embodiments, the media guidance application determines a type of virtual graphic to add to the second video stream 104 based on the event trigger. The media guidance application may then generate the virtual graphic based on the type of virtual graphic and the content of the second video stream 104, and may add the virtual graphic to the second video stream 104. For example, the media guidance application may determine to add a highlight to a receiver in a crowded end-zone based on the event trigger indicating the presence of a touchdown. In a crowded end zone, it can be difficult for a viewer to spot the receiver the first time the touchdown is shown, so the media guidance application may add additional graphics to help the viewer find where to look. The media guidance application would generate the highlight to be overlaid on the receiver and add this virtual graphic (the highlight) to the second video stream 104. Other graphics generated by the media guidance application may include graphics to highlight boundary lines (either on the ground, or with a 3-dimensional projection of the boundary), first down lines, particular players, or game elements such as balls or pucks. The media guidance application may access a database that associates different event triggers with different graphics. For example, a touchdown event trigger may be associated with a graphic highlighting a particular player. A challenge event trigger may be associated with a graphic highlighting a boundary line. Additional audio, visual, and/or closed captioning analysis may be performed to determine whether to generate a graphic, and which type of graphic to include. Visual analysis may be performed to determine how to generate the graphic, and where to place the graphic in each frame.

In some embodiments, when the media guidance application monitors the content of the first video stream 102 to identify the event trigger, the media guidance application receives a social media feed related to the content of the first video stream 102, and the media guidance application monitors a level of activity on the social media feed. In response to detecting that the level of activity on the social media feed exceeds a threshold level of activity, the media guidance application identifies the event trigger. For example, the media guidance application may receive a social media feed (e.g., a TWITTER feed or FACEBOOK feed) of electronic communications (e.g., social media posts) including posts related to the football game. A social media feed may include any data electronically communicated between individual users or content providers. The data may be shared privately between two or more users, or may be shared publicly. The data may originate with one user or content provider, and be re-transmitted by additional users. The data may include different types of data or content (e.g., text, images, video) in any format. Multiple feeds may be aggregated and then received by the media guidance application, and/or the media guidance application may receive multiple social media feeds.

If the media guidance application determines that a number of posts related to the game suddenly increases within a short period of time, the media guidance application may determine that an event has occurred in the game, and thus, the media guidance application may detect the event trigger. The media guidance application may determine that the posts relate to a team, an athlete, a coach, or any other participant in the live event, and the media guidance application may use this information to identify the event trigger. The media guidance application may analyze the content of the posts to determine a whether a particular type of event (e.g., a touchdown or goal) has occurred. The media guidance application may analyze the number and frequency of the posts, the content of the posts, any tags included in the posts, the moods of the posts, picture or videos included in the posts, and any other attributes relevant to identifying an event trigger. The media guidance may receive other types of supplemental data, such as data indicating that the score has changed or data indicating that a ball or puck has crossed into a goal. The data may be automatically generated (e.g., by electronic sensors) or manually generated (e.g., by a person viewing the event).

In some embodiments, when the media guidance application monitors the content of the first video stream 102 to identify the event trigger, the media guidance application monitors the content of the first video stream 102 to identify a first factor of the event trigger, the media guidance application monitors the content of the first video stream 102 to identify a second factor of the event trigger, and based on identifying the first factor and the second factor, the media guidance application identifies the event trigger. In such embodiments, the media guidance application does not identify the event trigger when the first factor is identified and the second factor is not identified, and the media guidance application does not identify the event trigger when the second factor is identified and the first factor is not identified. For example, the event trigger may be the announcer saying the word "touchdown" above a threshold volume level. If the media guidance application detects that the announcer says the word "touchdown" but at a lower volume, or if the media guidance application detects that the announcer reaches the threshold volume level but does not say the word "touchdown," the media guidance application would not identify this event trigger would not be identified. There may be more than two factors for a single trigger. The factors for a single event trigger may be found in different types of data, e.g., audio data, closed captioning data, visual data, social media data, etc.

In some embodiments, the media guidance application determines, based on identifying the event trigger, to transmit the second video stream 104 along with the first video stream 102. For example, because the user would be interested in viewing both the regular stream and the slow motion video with the touchdown, the media guidance application determines, based on identifying the event trigger indicating the presence of a touchdown event, to transmit the second, slow motion video stream of the touchdown along with the first video stream (the video stream showing the touchdown at regular speed).

Because there is often a time delay between the time that a video of a live event is received at a head-end or server and the time the video of the live event is transmitted to user equipment (e.g., so that a broadcast can be censored as needed), the live video of the event can be received and analyzed by the media guidance application before the media guidance application transmits the video to the user. For example, it may not be clear to the media guidance application that a touchdown play is happening until a catch is made and the catch is called by announcer. The delay window is long enough (typically seven seconds) that by the time the announcement is made, the catch would not have been transmitted to or displayed on user equipment. Thus, by the time the beginning of the catch would be transmitted to user equipment and displayed, the media guidance application would have received enough of the video feed to determine that the first video stream will include an event trigger and can simultaneously transmit the first video stream and the second video stream, both showing the detected event.

In some embodiments, the media guidance application also receives data describing an interaction involving a user equipment and monitors the data describing the interaction to identify in the interaction a reference to the event. In this case, the media guidance application may determine to transmit the second video stream along with the first video stream further based on the identifying in the interaction the reference to the event. The interaction may be an interaction between two users in the presence of user equipment. For example, the media guidance application may receive data from a microphone data feed that describes a conversation between two users watching the game, and the media guidance application may determine that the users are anticipating the touchdown event and then determine to transmit the second video stream along with the first video stream, because the users are interested in the event. The interaction may be between two or more users communicating via user equipment (e.g., between computers, smartphones, tablets, etc.). Alternatively, the interaction may be between the user and the user equipment; for example, the user may speak directly to the user equipment, or use an input device or other interface to provide preferences or interests.

The interaction may include statements or selections made without particular reference to the live event; for example, the media guidance application may detect that a user has indicated interest in a particular team or athlete. For example, if a user selects an athlete for a fantasy football team, this would indicate to the media guidance application that the user would be interested in viewing slow motion video streams of key events involving that athlete. An application detecting the interaction may analyze the interaction and transmit data summarizing the interaction to the media guidance application. Alternatively, the application may transmit data describing the raw interaction to the media guidance application to analyze the interaction.

For example, a user may permit the media guidance application to access data indicating the user's interests from other applications, such as fantasy sports applications, sports news applications, social media applications, or any other applications in which a user may express an interest in a live event or aspects of the live event. The media guidance application may determine that it can access one or more other applications that would provide information about the user's interests. The media guidance application may automatically access each of those applications, or the media guidance application may request permission from the user to access each of those applications to pull information from the application. The media guidance application then pulls relevant information from the application (e.g., teams or athletes that the user is interested in). If, for example, an application is a fantasy football application, the media guidance application may determine that the user is interested in players on the user's teams, players on the user's opponent's team, players that user has requested to add, players that the user has put on a watchlist, etc. If, for example, an application is a social media application, the media guidance application may determine that the user is interested in sports or athletes that the user has liked or followed. When the media guidance application determines that the user has expressed an interest in a particular sport, athlete, or other attribute of a live event, this may lower the threshold for other attributes that the media guidance application considers identify event triggers.

In some embodiments, when the media guidance application monitors the data describing the interaction to identify in the interaction the reference to the event, the media guidance application compares the contents of the data describing the interaction to metadata corresponding to the event; determines, based on the comparison, that the interaction relates to the event; and determines, based on the contents of the data describing the interaction, that the interaction indicates an interest in the event. For events during a football game, the metadata may include the type of event (e.g., scoring play, foul, first down, etc.), the player(s) involved in the event, the team(s) involved, the time that the event occurred, and any other relevant information for identifying the event.

For example, a user may express an interest in a player who makes a touchdown catch (e.g., by discussing that player with a friend, or by placing the player on his fantasy team). The media guidance application may receive the contents of this interaction and compare the contents of data describing the interaction (e.g., the name of the player) to metadata describing a touchdown, which would include the same player. The media guidance application then may determine, based on the comparison, that the conversation relates to that touchdown because the conversation discussed the player who made the touchdown catch. The media guidance application then may determine that the interaction indicates an interest in the event. For example, if the media guidance application determines that a user speaks positively or at length about the player making the touchdown catch, the media guidance application would determine that the user has indicated an interest in the event. On the other hand, if a user makes an offhand, negative remark about the player, the media guidance application may determine that the user is not interested in the event.

In some embodiments, the interaction involving the user equipment is an electronic communication received by the user equipment. For example, a user may be chatting over a communications network (e.g., a cell network or the Internet) with another user, via user equipment, such as a computer, smartphone, or tablet. In some embodiments, the media guidance application y compares the event to a list of events previously transmitted to the user equipment to determine whether the event had been previously transmitted to the user equipment. The media guidance application may determine to transmit the second video stream along with the first video stream further based on whether the event had been previously transmitted to the user equipment. For example, if two users are chatting about a touchdown, and the media guidance application determines that one user had not yet viewed the touchdown, the media guidance application would determine to transmit the two video streams 102 and 104 showing the touchdown so that they may be viewed by the user. A media guidance application may then display one or both of video streams 102 and 104 to the users. The media guidance application may already be displaying another video, e.g., another sports game, and could display the video stream 102 or 104 in a picture in picture window, or in some other manner so that the user can continue watching the video already being displayed.

The media guidance application may keep a record of the events that have been transmitted to the user equipment based on which live events the user equipment has displayed, and which video streams the user equipment has displayed. This way, if a user has already viewed a particular game or clip from a game, and is chatting about the clip with his friend, the media guidance application will not transmit this clip to the user, because the user has already seen it. However, if the user had not already viewed the clip, the media guidance application will automatically transmit the first video stream 102 and/or the second video stream 104, so that the user can see the event his friend is talking about.

In response to determining to transmit the second video stream 104 along with the first video stream 102, the media guidance application may simultaneously transmit both the first video stream 102 and the second video stream 104. The media guidance application may transmit the video streams 102 and 104 using communications circuitry, described with respect to FIG. 4. For example, the media guidance application may transmit the first video stream 102, which shows a touchdown at regular speed, and the second video stream 104, which shows a touchdown at a slower speed. Both of these video streams can be simultaneously displayed at user equipment, as shown in FIG. 1. One of the streams can be displayed in a picture-in-picture window, or the streams can be displayed side-by-side or in any other arrangement in the display 100. Alternatively, the two video streams may be displayed on two different devices.

As discussed above, the media guidance application may include in video streams 102 and 104 data specifying a playback rate that is different from a standard playback rate. The media guidance application can use this display rate to generate the video streams so that the first video stream 102 appears as regular speed and the second video stream 104 shows the same event in slow motion.

The second video stream 104 need not be merely a slowed down version of video stream 102. For example, the media guidance application may generate the second video stream 104 such that the second video stream 104 is a zoomed-in and slowed down version of the first video stream 104, to provide a better view of the event. The media guidance application may modify the second video stream 104 to have a different aspect ratio from video stream 102. If the media guidance application receives multiple video feeds showing the same event, the media guidance application can select a video feed for generating the second video stream 104 that is different from the video feed used to generate the first video stream 102. The video feed used for generating the second video may be at a different angle, or may have a closer shot. The video feed, zoom, aspect ratio, or other features of the second video stream 104 may be set automatically or manually.

In some embodiments, the media guidance application compares a length of the second video stream to a predetermined time period for transmitting the second video stream. In response to determining, based on the comparing, that the length of the second video stream has reached the predetermined time period, the media guidance application discontinues transmission of the second video stream while continuing to transmit the first video stream. For example, if the second video reaches a length of 10 seconds, the media guidance application may discontinue transmission of the slow motion video stream 104 while continuing to transmit the regular-speed video stream 102. Different event types may be associated with different set predetermined time periods, and the media guidance application may determine the predetermined time period based on the event type.

In some embodiments, the media guidance application monitors the content of the first video stream to identify an end of the event, and in response to identifying the end of the event, media guidance application discontinues transmission of the second video stream while continuing to transmit the first video stream. For example, the media guidance application may perform motion sensing of the video stream to determine when the touchdown play has ended and, having determined that the touchdown play has ended, media guidance application discontinues transmission of the slow motion video stream 104 while continuing to transmit the regular-speed video stream 102. For example, if the video abruptly switches to another vantage point after the touchdown was announced, this could indicate an end of the event.

The media guidance application may use a combination of the predetermined time period and monitoring the first video stream to decide when to discontinue transmission of the second video stream. For example, the media guidance application may identify a particular moment in the first video stream, such as when a ball is caught or an athlete crosses a finish line, and then discontinue transmission of the slow motion video stream 104 a predetermined time period after that moment.

In some embodiments, the media guidance application includes a chat component, in which a user may communication with one or more additional users. For example, the users may transmit electronic messages, may speak into a microphone, may transmit video messages, or may use any other means to transmit messages to each other. The media guidance application may analyze the content of these messages to determine what video stream to display, or what portion of a video stream to display. For example, if a media guidance application is displaying a video stream to a user, and the user receives a message discussing a different point in that video stream, the media guidance application may determine the point in the video stream to which the message relates, and automatically begin displaying the video stream from the point to which the message relates. As another example, if a media guidance application is displaying a video stream to a user (e.g., one football game), and the user receives a message discussing a different video stream (e.g., a second football game, or a particular play in that game), the media guidance application may determine the video stream to which the message relates (i.e., the second football game, or the particular play) and automatically begin displaying the video stream to which the message relates. The automatically played video stream may be the only video stream which the media guidance application displays, or the media guidance application may play continue to play the video stream that the media guidance application was originally displaying. For example, the media guidance application may display both video streams in a picture-in-picture arrangement, in a side-by-side arrangement, or any other arrangement.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
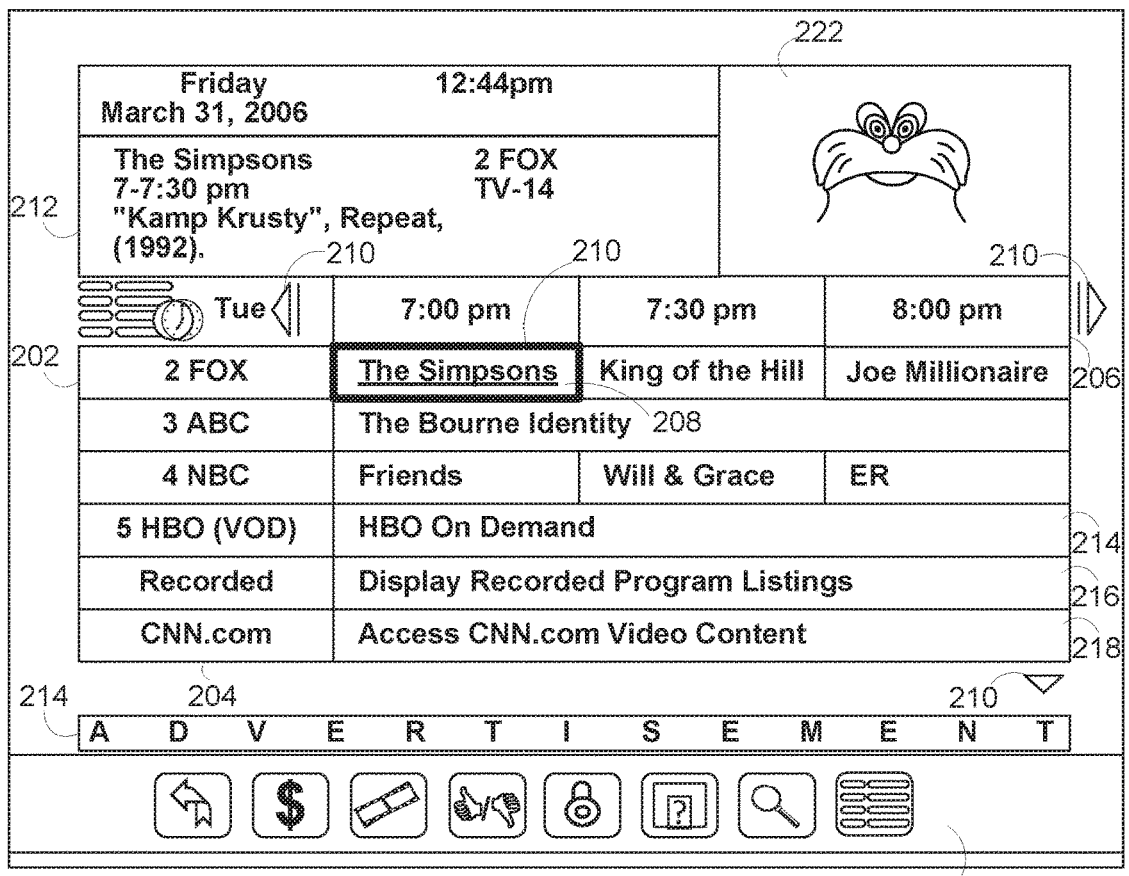
FIG. 2 shows an illustrative example of a display screen generated by a media guidance application, in accordance with some embodiments of the disclosure.
Figure 3:
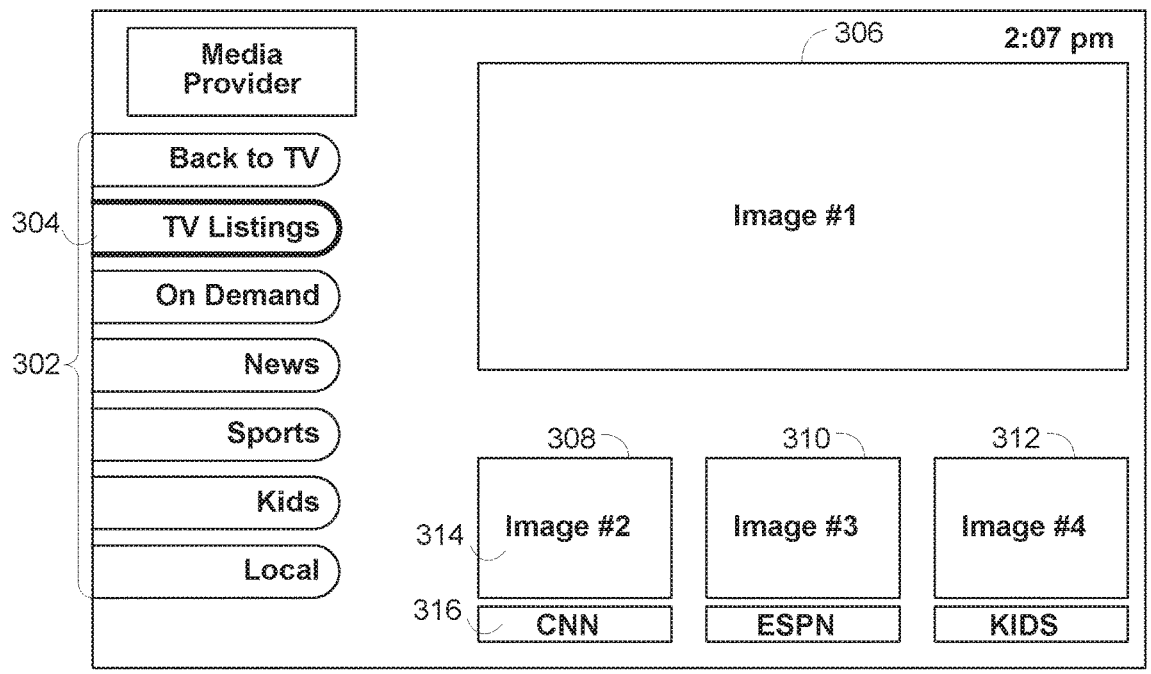
FIG. 3 shows another illustrative example of a display screen generated by a media guidance application, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
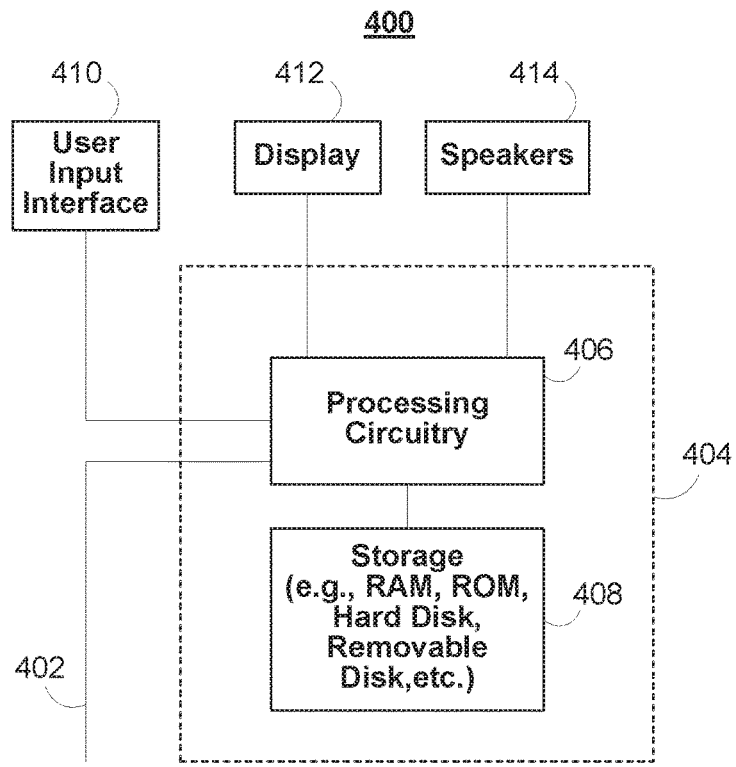
FIG. 4 is a block diagram of an illustrative user equipment device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
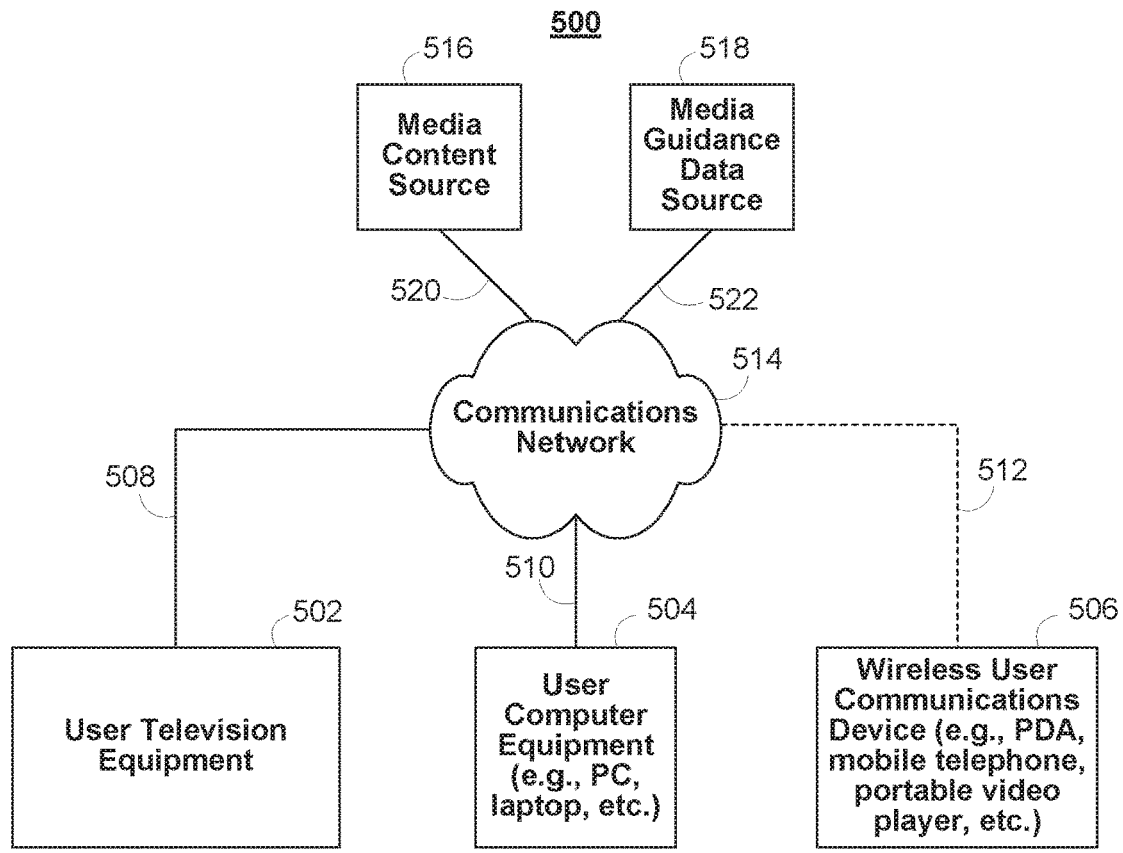
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
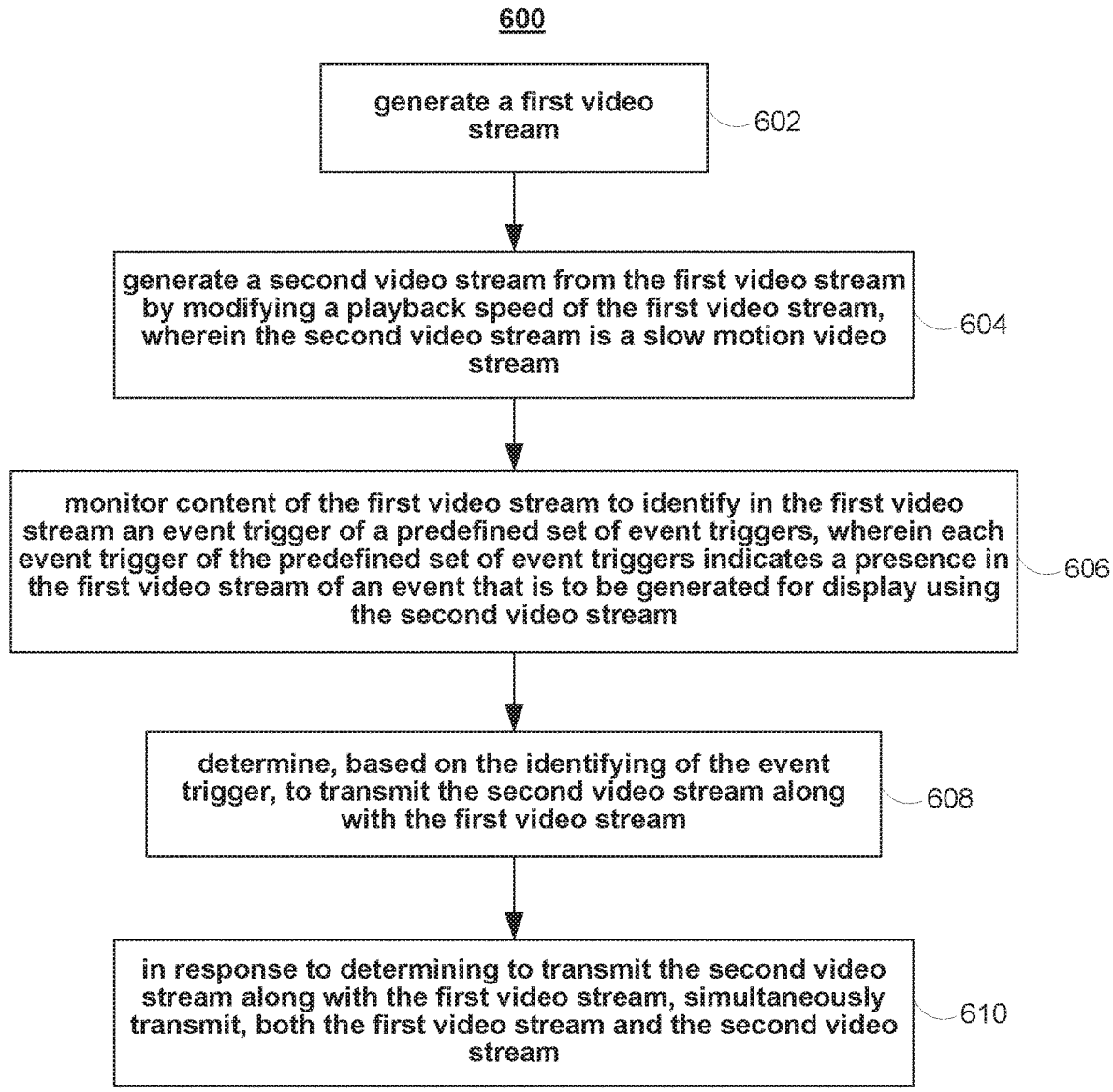
FIG. 6 is a flowchart of illustrative steps involved in providing a video stream along with a slow motion video stream showing a particular event depicted in the video stream, in accordance with some embodiments of the disclosure.
Figure 7:
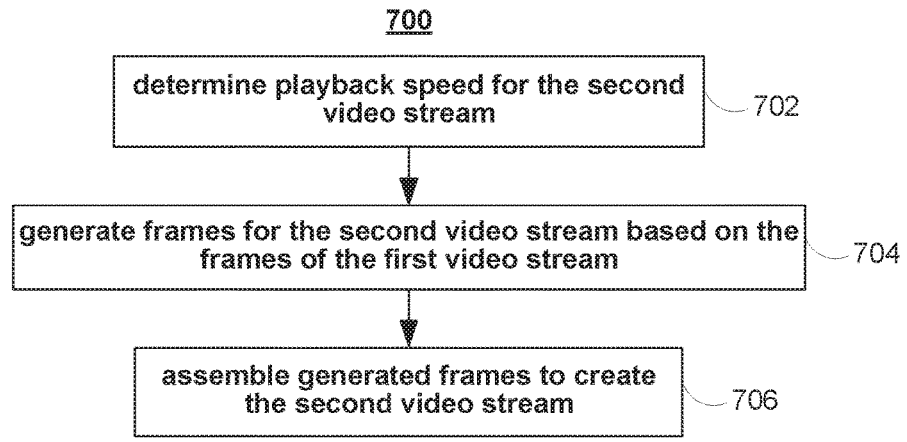
FIG. 7 is a flowchart of illustrative steps for generating a slow motion video stream, in accordance with some embodiments of the disclosure.
Figure 8:
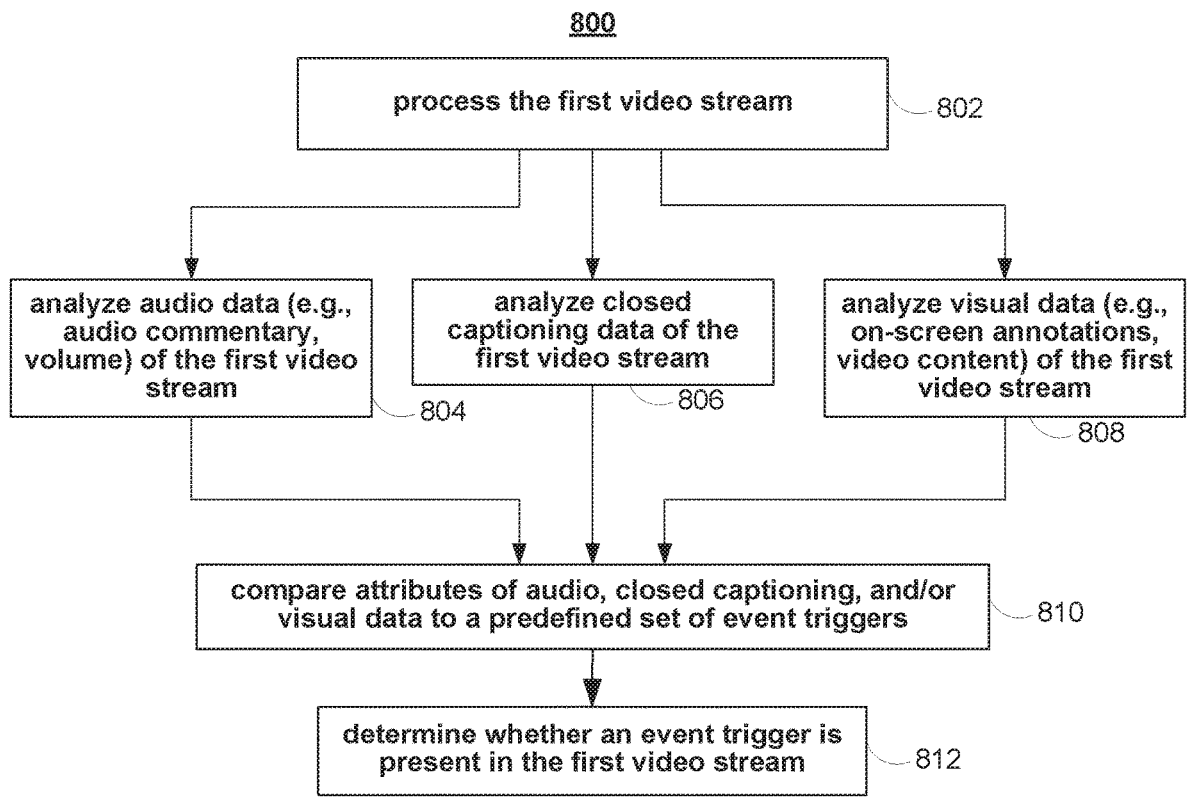
FIG. 8 is a flowchart of illustrative steps for determining whether an event trigger for transmitting a slow motion video stream is present in a video stream, in accordance with some embodiments of the disclosure.

FIGS. 6-8 present processes for control circuitry (e.g., control circuitry 404) to provide a video stream along with a slow motion video showing a particular event depicted in the video stream in accordance with some embodiments of the disclosure. In some embodiments this algorithm may be encoded on to non-transitory storage medium (e.g., storage device 408) as a set of instructions to be decoded and executed by processing circuitry (e.g., processing circuitry 406). Processing circuitry may in turn provide instructions to other sub-circuits contained within control circuitry 404, such as the tuning, video generating, encoding, decoding, encrypting, decrypting, scaling, analog/digital conversion circuitry, and the like.

FIG. 6 is a flowchart of illustrative steps involved in providing a video stream along with a slow motion video stream showing a particular event depicted in the video stream, in accordance with some embodiments of the disclosure. The flowchart in FIG. 6 describes a process 600 implemented on control circuitry (e.g., control circuitry 404). The control circuitry 404 may be acting under commands from the media guidance application, as described above. The elements of process 600 may be performed at user equipment devices 502, 504, and/or 506, or at the media content source 516, or at a combination of devices and/or sources.

At 602, control circuitry 404 generates a first video stream. Generating a first video stream 102 is described with respect to FIG. 1. Display 100, which displays the first video stream 102, may be display 412, described above with respect to FIG. 4. Display 100 may be generated by the user television equipment 502, the user computer equipment 504, or the wireless user communications device 506, described above with respect to FIG. 4. As one example, control circuitry 404 generates a first video stream 102 depicting a football game, based on a video feed of the football game received from media content source 516.

At 604, control circuitry 404 generates a second video stream 104 from the first video stream 102 by modifying a playback speed of the first video stream 102. The second video stream 104 is a slow motion video stream. The process of generating a slow motion video stream is described with respect to FIG. 1 and is described further with respect to FIG. 7. For example, the media guidance application may duplicate the first video stream 102 to create the second video stream 104 and then may modify the properties of the second video stream 104 depicting the football game (e.g., to specify a slower playback rate), or may modify the second video stream itself 104 (e.g., by adding frames), to create a slow motion version of the video stream depicting the football game.

At 606, control circuitry 404 monitors content of the first video stream to identify in the first video stream an event trigger of a predefined set of event triggers. Each event trigger of the predefined set of event triggers indicates a presence in the first video stream of an event that is to be generated for display using the second video stream. The predefined set of event triggers may be stored in storage 408 and accessed by processing circuitry 406. Event triggers are described with respect to FIG. 1. For example, one event trigger may be a touchdown in a football game, which may be detected when the control circuitry 404 identifies in the first video stream the word "touchdown" spoken above a threshold volume level. The control circuitry 404 determines the presence in the first video stream 102 of the touchdown event, which is to be generated for display using the second video stream 104. The process of monitoring content to identify event triggers is further described with respect to FIG. 8, and is described with respect to FIG. 1.

At 608, control circuitry 404 determines, based on the identifying of the event trigger, to transmit the second video stream 104 along with the first video stream 102. For example, based on identifying the touchdown event trigger in the first video stream 102, control circuitry 404 determines to transmit the second video stream 104, showing the touchdown in flow motion, along with the first video stream 102. The process of determining to transmit the second video stream is further described with respect to FIG. 1.

At 610, communications circuitry simultaneously transmits both the first video stream 102 and the second video stream 104 in response to determining to transmit the second video stream 104 along with the first video stream 102. As described with respect to FIG. 4, control circuitry 404 may include communications circuitry. The video streams 102 and 104 may be received by the user television equipment 502, the user computer equipment 504, or the wireless user communications device 506 for displaying both video streams simultaneously, as shown in FIG. 1. The communications circuitry may transmit video stream 102 and 104 over communications network 514.

FIG. 7 is a flowchart of illustrative steps for generating a slow motion video stream, in accordance with some embodiments of the disclosure. The flowchart in FIG. 7 describes a process 700 implemented on control circuitry (e.g., control circuitry 404). The control circuitry 404 may be acting under commands from the media guidance application, as described above. The elements of process 700 may be performed at user equipment devices 502, 504, and/or 506, or at the media content source 516, or at a combination of devices and/or sources.

At 702, control circuitry 404 determines a playback speed for the second video stream 104. As discussed with respect to FIG. 1, there may be a fixed playback speed for all slow motion video streams, or the playback speed may vary based on, e.g., the type of live event, the event trigger, the amount of visual change between frames, and other factors. The control circuitry 404 can perform any required database lookups (e.g., by looking up playback speed information stored in storage 408) and/or video analysis of the first video stream 102 to determine the playback speed for the second video stream 104.

At 704, control circuitry 404 generates frames for the second video stream 104 based on the frames of the first video stream 102. As described with respect to FIG. 1, the first video stream 102, or frames of the first video stream 102, may be duplicated to generate second video stream 104. Additional frames may also be generated based on the frames of the first video stream 102 to fill in gaps between frames in the second video stream 104. These additional frames may be copies of the frames in the first video stream 102, or control circuitry 404 may digitally interpolate frames for insertion between the frames of the duplicated first video stream 102. Alternatively, control circuitry 404 may point to the frames of the first video stream 102 to generate the frames for the second video stream 104.

At 706, control circuitry 404 assembles the generated frames to create the second video stream. For example, if control circuitry 404 copied frames from the first video stream 102, these can be ordered and assembled to create the second video stream. If control circuitry 404 has digitally interpolated frames for the second video stream 104, these will be inserted between the frames of the duplicated first video stream 102 to assemble the second video stream 104.

FIG. 8 is a flowchart of illustrative steps for determining whether an event trigger for transmitting a slow motion video stream is present in a video stream, in accordance with some embodiments of the disclosure. The flowchart in FIG. 8 describes a process 800 implemented on control circuitry (e.g., control circuitry 404). The control circuitry 404 may be acting under commands from the media guidance application, as described above. The elements of process 800 may be performed at user equipment devices 502, 504, and/or 506, or at the media content source 516, or at a combination of devices and/or sources.

At 802, control circuitry 404 processes the first video stream 102 which has been generated by control circuitry 404. The processing performed by control circuitry 404 may involve reading and separating out the audio, closed captioning, and video data so that the audio, closed captioning, and video data can each be separately analyzed. The processing may further involve performing speech recognition for the audio data so that the words in the audio data may be analyzed. Control circuitry 404 may perform at 802 any other pre-processing that is needed to analyze the audio, closed captioning, and visual data for event triggers.

At 804, control circuitry 404 analyzes audio data of the first video stream 102. As described with respect to FIG. 1, audio data can include the words in a commentary track, volume, speaker identifications, and other relevant attributes for identifying event triggers.

At 806, control circuitry 404 analyzes closed captioning data of the first video stream 102. As described with respect to FIG. 1, closed captioning data may include the commentator's analysis, other spoken words (e.g., chants from the crowd, referee comments), the identification of the speaker(s), and any other attributes which can be used to identify event triggers.

At 808, control circuitry 404 analyzes visual data of the first video stream 102. As described with respect to FIG. 1, visual data can include on-screen annotations, frame-by-frame visual content, movement analysis, and other relevant attributes for identifying event triggers. As shown in FIG. 8, elements 804, 806, and 808 may be performed in parallel.

At 810, control circuitry 404 compares the attributes of the audio, closed captioning, and/or visual data to a predefined set of event triggers. The predefined set of event triggers may be stored in storage 408. As described with respect to FIG. 1, a predefined event trigger may describe a single feature or a combination of factors detected in one or more types of data. The features and factors identified through the analysis of elements 804-808 are compared to the predefined event triggers.

At 812, control circuitry 404 determines whether an event trigger is present in the first video stream 102. In particular, if the comparison at 810 indicates that the features or factors of one or more event trigger are present in the analyzed data, then control circuitry 404 determines that an event trigger is present in the video stream.

Figure 9:
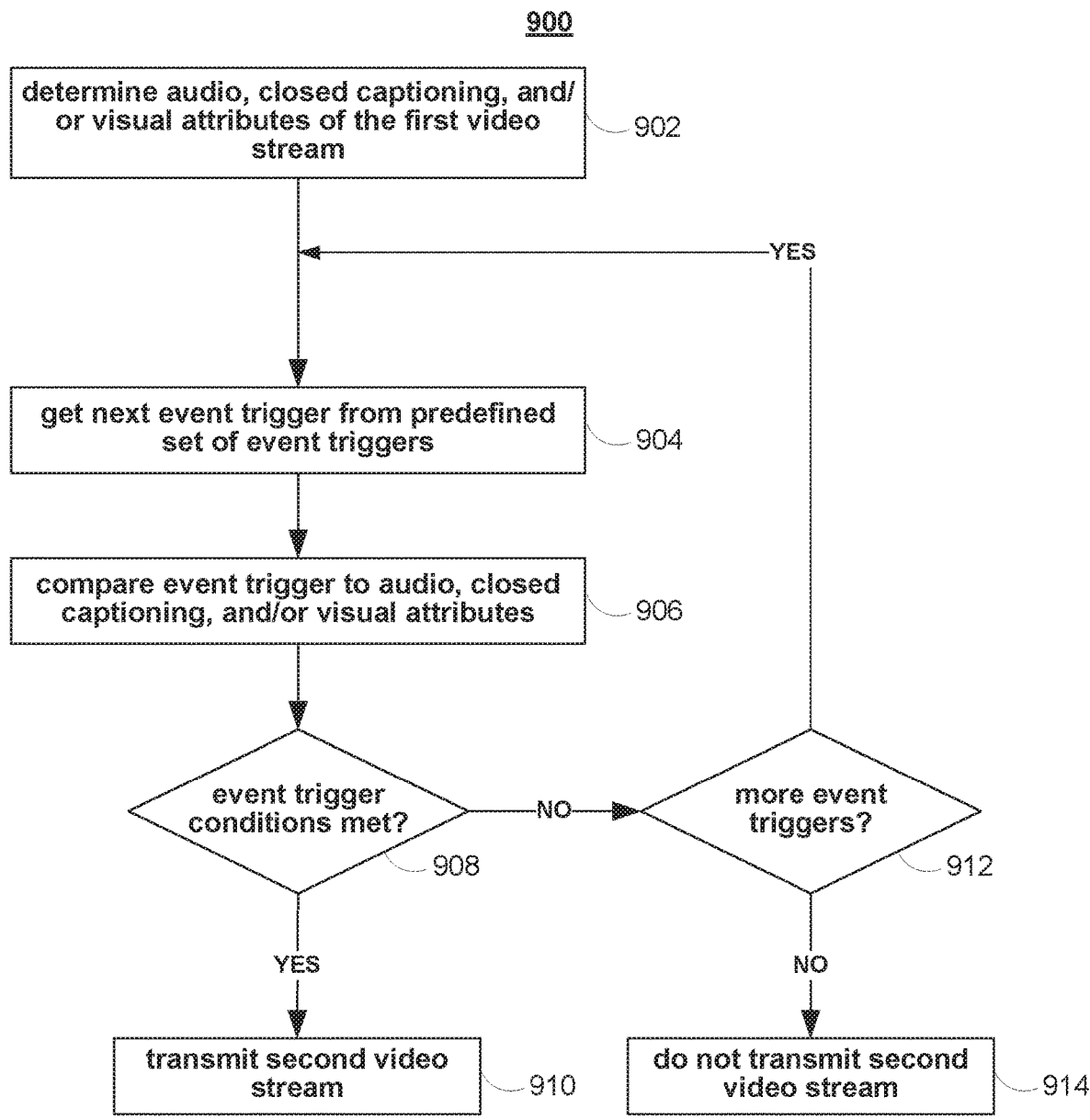
FIG. 9 is a flowchart of illustrative steps for determining whether to transmit a second video stream, in accordance with some embodiments of the disclosure.

FIG. 9 is a flowchart of illustrative steps for determining whether to transmit a second video stream, in accordance with some embodiments of the disclosure. The flowchart in FIG. 9 describes a process 900 implemented on control circuitry 404. The control circuitry 404 may be acting under commands from the media guidance application, as described above. The elements of process 900 may be performed at user equipment devices 502, 504, and/or 506, or at the media content source 516, or at a combination of devices and/or sources.

At 902, control circuitry 404 determines audio, closed captioning, and/or visual attributes of the first video stream 102. The audio, closed captioning, and/or visual attributes of the first video stream may be determined by analyzing the audio, closed captioning, and/or visual attributes, as described with respect to elements 804, 806, and 808 of FIG. 8, and as described above with respect to FIG. 1.

At 904, control circuitry 404 gets the next event trigger from the predefined set of event triggers. The first time control circuitry 404 performs element 904, the first event trigger from the predefined set of event triggers is retrieved. The predefined set of event triggers may be retrieved from storage 408.

At 906, control circuitry 404 compares the retrieved event trigger to the audio, closed captioning, and visual attributes of the first video stream.

At 908, control circuitry 404 determines whether the conditions of the retrieved event trigger are met by the audio, closed captioning, and visual attributes. As described with respect to FIG. 1, an event trigger may include one or more attributes or factors, and if the determined attributes do not match all factors of the event trigger, the event trigger conditions are not met. An event trigger may have more complex logic, such as OR NOT conditions. For example, an event trigger for a challenge may be met either if a red flag appears in a frame, or if the word "challenge" is spoken or present in the closed captioning and a coach's face appears in a frame.

If decision 908 determines that all of the event trigger conditions are met, the control circuitry 404 transmits the second video stream 104 at 910. The control circuitry 404 may transmit the second video stream 104 over communications network 514. The transmission of the second video stream 104 is described with respect to FIG. 1.

If decision 908 determines that all of the event trigger conditions are not met, the control circuitry 404 continues to decision 912. At decision 912, control circuitry 404 determines whether the predetermined list of event triggers includes any more event triggers. If control circuitry 404 determines that the predetermined list of event triggers includes more event triggers, control circuitry 404 returns to element 904.

If at 912 control circuitry 404 determines that the predetermined list of event triggers does not include any more event triggers, control circuitry 404 proceeds to element 914. At 914, control circuitry 404 does not transmit the second video stream 104, because no event trigger is present.

As shown in FIG. 9, control circuitry 404 checks each event trigger sequentially. Alternatively, control circuitry 404 may check whether the conditions of two or more event triggers are met in parallel. As shown in FIG. 9, control circuitry 404 stops checking for event triggers after an event trigger is found. Alternatively, control circuitry 404 may continue checking for additional event triggers, which may be used to determine, e.g., the speed of the second video stream 104 and/or additional graphics to include in the second video stream 104.

It is contemplated that the descriptions of FIGS. 6-9 may be used with any other embodiment of this disclosure. In addition, the descriptions described in relation to the algorithms of FIGS. 6-9 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments several instances of a variable may be evaluated in parallel, using multiple logical processor threads, or the algorithm may be enhanced by incorporating branch prediction. Furthermore, it should be noted that the process of FIGS. 6-9 may be implemented on a combination of appropriately configured software and hardware, and that any of the devices or equipment discussed in relation to FIGS. 4-5 could be used to implement one or more portions of the process.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
generating, with control circuitry, a first video stream;
generating, with the control circuitry, a second video stream from the first video stream by modifying a playback speed of the first video stream, wherein the second video stream is a slow motion video stream;
monitoring, with the control circuitry, content of the first video stream to identify in the first video stream an event trigger of a predefined set of event triggers, wherein each event trigger of the predefined set of event triggers indicates a presence in at least a frame of the first video stream of metadata associated with an activity of interest that is to be generated for display using the second video stream;
determining, with the control circuitry, based on an identifying of the event trigger, to transmit the second video stream along with the first video stream; and
in response to determining to transmit the second video stream along with the first video stream, simultaneously transmitting, with communications circuitry, both the first video stream and the second video stream for simultaneous display of both the first video stream and the second video stream at an end user device.

2. The method of claim 1, further comprising:
determining a type of an event associated with the event trigger;
comparing the type to entries of a database, wherein each respective entry of the entries associates a different type of event to a predefined slow motion playback speed;
identifying a predefined playback speed for the second video stream based on the comparing; and
modifying a playback speed of the second video stream to equal the predefined playback speed.

3. The method of claim 1, further comprising:
determining a type of virtual graphic to add to the second video stream based on the event trigger;
generating the virtual graphic based on the type of virtual graphic and content of the second video stream; and
adding the virtual graphic to the second video stream.

4. The method of claim 1, further comprising:
receiving data describing an interaction involving a user equipment; and
monitoring the data describing the interaction to identify in the interaction a reference to the event;
wherein determining to transmit the second video stream along with the first video stream is further based on the identifying in the interaction the reference to the event.

5. The method of claim 4, wherein monitoring the data describing the interaction to identify in the interaction the reference to the event comprises:
comparing contents of the data describing the interaction to metadata corresponding to the event;
determining, based on the comparison, that the interaction relates to the event; and
determining, based on the contents of the data describing the interaction, that the interaction indicates an interest in the event.

6. The method of claim 4, wherein the interaction involving the user equipment comprises an electronic communication received by the user equipment, wherein the method further comprises comparing the event to a list of events previously transmitted to the user equipment to determine whether the event had been previously transmitted to the user equipment, and wherein determining to transmit the second video stream along with the first video stream is further based on whether the event had been previously transmitted to the user equipment.

7. The method of claim 1, wherein monitoring the content of the first video stream to identify in the first video stream the event trigger comprises:

receiving a social media feed related to the content of the first video stream; and monitoring a level of activity on the social media feed to identify the event trigger; and in response to detecting, during the monitoring, that the level of activity on the social media feed exceeds a threshold level of activity, identifying the event trigger.

8. The method of claim 1, wherein monitoring the content of the first video stream to identify in the first video stream the event trigger of the predefined set of event triggers comprises:

monitoring the content of the first video stream to identify a first factor of the event trigger;

monitoring the content of the first video stream to identify a second factor of the event trigger; and based on identifying the first factor and the second factor, identifying the event trigger, wherein the event trigger is not identified when the first factor is identified and the second factor is not identified, and wherein the event trigger is not identified when the second factor is identified and the first factor is not identified.

9. The method of claim 1, further comprising:

comparing a length of the second video stream to a predetermined time period for transmitting the second video stream; and in response to determining, based on the comparing, that the length of the second video stream has reached the predetermined time period, discontinuing transmission of the second video stream while continuing to transmit the first video stream.

10. The method of claim 1, further comprising:

monitoring the content of the first video stream to identify an end of the event; and in response to identifying the end of the event, discontinuing transmission of the second video stream while continuing to transmit the first video stream.

11. A system comprising:

control circuitry configured to:

generate a first video stream;

generate a second video stream from the first video stream by modifying a playback speed of the first video stream, wherein the second video stream is a slow motion video stream;

monitor content of the first video stream to identify in the first video stream an event trigger of a predefined set of event triggers, wherein each event trigger of the predefined set of event triggers indicates a presence in at least a frame of the first video stream of metadata associated with an activity of interest that is to be generated for display using the second video stream; and determine based on an identifying of the event trigger, to transmit the second video stream along with the first video stream; and communications circuitry configured to:

in response to determining to transmit the second video stream along with the first video stream, simultaneously transmit both the first video stream and the second video stream for simultaneous display of both the first video stream and the second video stream at an end user device.

12. The system of claim 11, wherein the control circuitry is further configured to:

determine a type of an event associated with the event trigger;

compare the type to entries of a database, wherein each respective entry of the entries associates a different type of event to a predefined slow motion playback speed;

identify a predefined playback speed for the second video stream based on the comparing; and modify a playback speed of the second video stream to equal the predefined playback speed.

13. The system of claim 11, wherein the control circuitry is further configured to: determine a type of virtual graphic to add to the second video stream based on the event trigger;

generate the virtual graphic based on the type of virtual graphic and content of the second video stream; and add the virtual graphic to the second video stream.

14. The system of claim 11, wherein the control circuitry is further configured to: receive data describing an interaction involving a user equipment; and monitor the data describing the interaction to identify in the interaction a reference to the event;

wherein the control circuitry is further configured to determine to transmit the second video stream along with the first video stream is further based on the identifying in the interaction the reference to the event.

15. The system of claim 14, wherein the control circuitry is further configured, when monitoring the data describing the interaction to identify in the interaction the reference to the event, to:

compare contents of the data describing the interaction to metadata corresponding to the event;

determine, based on the comparison, that the interaction relates to the event; and determine, based on the contents of the data describing the interaction, that the interaction indicates an interest in the event.

16. The system of claim 14, wherein the interaction involving the user equipment comprises an electronic communication received by the user equipment, wherein the control circuitry is further configured to compare the event to a list of events previously transmitted to the user equipment to determine whether the event had been previously transmitted to the user equipment, and wherein the control circuitry is further configured to determine to transmit the second video stream along with the first video stream further based on whether the event had been previously transmitted to the user equipment.

17. The system of claim 11, wherein the control circuitry is further configured, when monitoring the content of the first video stream to identify in the first video stream the event trigger, to:

receive a social media feed related to the content of the first video stream; and monitor a level of activity on the social media feed to identify the event trigger; and in response to detecting, during the monitoring, that the level of activity on the social media feed exceeds a threshold level of activity, identify the event trigger.

18. The system of claim 11, wherein the control circuitry is further configured, when monitoring the content of the first video stream to identify in the first video stream the event trigger of the predefined set of event triggers, to:

monitor the content of the first video stream to identify a first factor of the event trigger;

monitor the content of the first video stream to identify a second factor of the event trigger; and based on identifying the first factor and the second factor, identify the event trigger, wherein the event trigger is not identified when the first factor is identified and the second factor is not identified, and wherein the event trigger is not identified when the second factor is identified and the first factor is not identified.

19. The system of claim 11, wherein the control circuitry is further configured to:
   compare a length of the second video stream to a predetermined time period for transmitting the second video stream; and
   in response to determining, based on the comparing, that the length of the second video stream has reached the predetermined time period, discontinue transmission of the second video stream while continuing to transmit the first video stream.

20. The system of claim 11, wherein the control circuitry is further configured to:
   monitor the content of the first video stream to identify an end of the event; and
   in response to identifying the end of the event, discontinue transmission of the second video stream while continuing to transmit the first video stream.

* * * * *